US009122985B2

(12) United States Patent
Dove et al.

(10) Patent No.: US 9,122,985 B2
(45) Date of Patent: Sep. 1, 2015

(54) PROGRAMMATIC ACCESS TO TERMINOLOGIES EXPRESSED IN HIERARCHICAL FORM

(75) Inventors: Bryan Dove, Seattle, WA (US); Jonathan A. Handler, Northbrook, IL (US); Michael J. Bortnick, Oswego, IL (US); Dongbai Guo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 13/283,596

(22) Filed: Oct. 28, 2011

(65) Prior Publication Data

US 2013/0110763 A1  May 2, 2013

(51) Int. Cl.
*G06F 17/00* (2006.01)
*G06N 7/00* (2006.01)
*G06N 7/08* (2006.01)
*G06N 5/02* (2006.01)
*G06F 17/27* (2006.01)

(52) U.S. Cl.
CPC .............. *G06N 5/02* (2013.01); *G06F 17/2785* (2013.01)

(58) Field of Classification Search
CPC ............................ G06N 5/02; G06F 17/2785
USPC .......................................................... 706/55
See application file for complete search history.

(56) References Cited

U.S. PATENT DOCUMENTS

| | | | |
|---|---|---|---|
| 6,012,067 A | 1/2000 | Sarkar | |
| 6,023,694 A | 2/2000 | Kouchi et al. | |
| 6,601,071 B1 | 7/2003 | Bowker et al. | |
| 6,609,123 B1 | 8/2003 | Cazemier et al. | |
| 6,622,144 B1 | 9/2003 | Rush, Jr. | |
| 6,640,231 B1 | 10/2003 | Andersen et al. | |
| 7,133,864 B2 | 11/2006 | Roth | |
| 7,293,254 B2 | 11/2007 | Bloesch et al. | |
| 7,493,253 B1* | 2/2009 | Ceusters et al. | 704/9 |
| 7,505,989 B2 | 3/2009 | Gardner et al. | |
| 7,533,124 B2 | 5/2009 | Hellman et al. | |
| 7,672,924 B1 | 3/2010 | Scheurich et al. | |
| 7,680,818 B1 | 3/2010 | Fan et al. | |
| 7,937,243 B2 | 5/2011 | Yen et al. | |
| 8,468,160 B2 | 6/2013 | Hassanzadeh et al. | |
| 2001/0020237 A1 | 9/2001 | Yarnall et al. | |
| 2002/0002594 A1 | 1/2002 | Roundtree et al. | |

(Continued)

OTHER PUBLICATIONS

SNOMED Clinical Terms User Guide, International Health Terminology Standards Development Organization, Jan. 2010 International Release (US English).*

(Continued)

*Primary Examiner* — Jeffrey A Gaffin
*Assistant Examiner* — Robert H Bejcek, II
(74) *Attorney, Agent, or Firm* — Jessica Meyers; Jim Ross; Micky Minhas (57) ABSTRACT

The described implementations relate to expressing terminologies in a hierarchical form. One implementation can receive a terminology that can include concept-code pairs. For example, each of the concept-code pairs can include a concept and a code that is assigned to the concept by the terminology. The implementation can map the concepts to levels of a hierarchical ontology, and associate some of the concepts across different levels of the hierarchical ontology. The implementation can also provide programmatic access to the concept-code pairs of the terminology via the hierarchical ontology.

20 Claims, 7 Drawing Sheets

(56) References Cited

U.S. PATENT DOCUMENTS

| | | | |
|---|---|---|---|
| 2003/0110177 | A1 | 6/2003 | Andrei et al. |
| 2003/0131215 | A1 | 7/2003 | Bellew |
| 2004/0158455 | A1 | 8/2004 | Spivack et al. |
| 2005/0039033 | A1 | 2/2005 | Meyers et al. |
| 2005/0055369 | A1 | 3/2005 | Gorelik et al. |
| 2006/0053169 | A1 | 3/2006 | Straub et al. |
| 2007/0094188 | A1* | 4/2007 | Pandya et al. ............... 706/45 |
| 2008/0077598 | A1 | 3/2008 | Wilmering et al. |
| 2009/0024615 | A1* | 1/2009 | Pedro et al. ................. 707/5 |
| 2010/0318548 | A1* | 12/2010 | Mayr et al. ................. 707/759 |
| 2011/0145210 | A1 | 6/2011 | Rathinam et al. |
| 2011/0320433 | A1 | 12/2011 | Mohiuddin et al. |
| 2012/0110016 | A1* | 5/2012 | Phillips ................ 707/780 |

OTHER PUBLICATIONS

Pinto et al., Some Issues on Ontology Integration, Proceedings of the IJCAI-99 workshop on Ontologies and Problem-Solving Methods (KRR5), Stockholm, Sweden, Aug. 2, 1999.*

Tudorache et al., Will Semantic Web Technologies Work for the Development of ICD-11?, ISWC 2010, Part II, LNCS 6497, pp. 257-272, 2010.*

Noy, Semantic Integration: A Survey of Ontology-Based Approaches, SIGMOD Record, vol. 33, No. 4, Dec. 2004.*

Lee et al., Ontology Integration: Experience with Medical Terminologies, Computers in Biology and Medicine 36 pp. 893-919, 2006.*

Noy, et al., "Ontology Development 101: A Guide to Creating Your First Ontology", Retrieved at <<http://www2.enel.ucalgary.ca/People/far/Lectures/SENG697/PDF/ontology-tutorial.pdf>>, Stanford Medical Informatics Technical Report, Mar. 2001, pp. 1-25.

"Resource Description Framework (RDF)", Retrieved at <<http://www.w3.org/RDF/>>, Feb. 10, 2004, pp. 3.

Dhamankar, et al., "iMAP: Discovering Complex Semantic Matches between Database Schemas", Retrieved at << http://dit.unitn.it/~accord/RelatedWork/Matching/iMAP04.pdf>>, International Conference on Management of Data, Proceedings of the 2004 ACM SIGMOD international conference on Management of data, Jun. 13-18, 2004, pp. 12.

Cafarella, et al., "WebTables: Exploring the Power of Tables on the Web", Retrieved at << http://www.eecs.umich.edu/~michjc//papers/webtables_vldb08.pdf >>, Proceedings of the VLDB Endowment, vol. 1, No. 1, Aug. 2008, pp. 12.

Halevy, et al., "Piazza: Data Management Infrastructure for Semantic Web Applications", Retrieved at << http://www.cis.upenn.edu/~zives/research/piazza-www03.pdf >>, International World Wide Web Conference, Proceedings of the 12th international conference on World Wide Web, May 20-24, 2003, pp. 12.

Pavlo, et al., "A Comparison of Approaches to Large-Scale Data Analysis", Retrieved at << http://www.cs.brandeis.edu/~olga/cs228/Reading%20List_files/benchmarks-sigmod09.pdf >>, International Conference on Management of Data, Proceedings of the 35th SIGMOD international conference on Management of data, Jun. 29-Jul. 2, 2009, pp. 14.

Ahmed, et al., "An Introduction to Topic Maps", Retrieved at <<http://msdn.microsoft.com/en-us/library/aa480048.aspx, Jul. 2005, pp. 13.

Cohen, Shy., "Ontology and Taxonomy of Services in a Service-Oriented Architecture", Retrieved at <<http://msdn.microsoft.com/en-us/architecture/bb491121.aspx>>, Retrieved Date: Jun. 23, 2011, pp. 6.

Non-Final Office Action for U.S. Appl. No. 13/169,923, Mailed Date: May 17, 2013.

Response to the Non-Final Office Action for U.S. Appl. No. 13/169,923, filed Sep. 6, 2013.

Final Office Action for U.S. Appl. No. 13/169,923, Mailed Date: Dec. 18, 2013.

Response to the Final Office Action for U.S. Appl. No. 13/169,923, filed Feb. 24, 2014.

Non-Final Office Action from U.S. Appl. No. 12/823,145 Mailed Mar. 30, 2015.

U.S. Appl. No. 12/823,145, Response to Non-Final Office Action, Mailed Mar. 30, 2015, filed Jun. 30, 2015, 24 pages.

* cited by examiner

PROGRAMMATIC ACCESS TO TERMINOLOGIES EXPRESSED IN HIERARCHICAL FORM

BACKGROUND

Because of advances in their computational power, modern computers can allow users to process vast amounts of data in very little time. However, computers tend to represent knowledge in relatively inflexible, counter-intuitive formats that are not readily digestible for programmers or other users. For example, the medical profession uses various standardized terminologies for organizing medical data, e.g., SNOMED—CT (Systemized Nomenclature of Medicine—Clinical Terms) and ICD-9 (International Classification of Diseases—9th Edition). While these standardized terminologies can provide convenient representations of various medical concepts, they do not express relationships between these concepts in an intuitive form.

Furthermore, standardized terminologies tend to evolve over time, e.g., new drugs or diagnoses can be added to medical terminologies as these drugs or diagnoses become integrated into the medical profession. Applications built on a specific version of a terminology can tend to have dependencies on that version that need to be resolved as new versions of the terminology are released. Further complications can arise when applications are required to provide interoperability between different standardized terminologies.

SUMMARY

The described implementations relate to providing programmatic access to knowledge expressed in one or more terminologies. One implementation is manifested as a system that can include a terminology analyzer, an application programming interface including a function, and a processor. The terminology analyzer can be configured to receive a terminology that includes concept-code pairs, and each of the concept-code pairs can include a concept and a code assigned to the concept by the terminology. The terminology analyzer can also be configured to map the concept-code pairs to at least two different levels of a hierarchical ontology, and associate some of the concepts across different levels of the hierarchical ontology. The function can be configured to receive a request to access the hierarchical ontology, and the request can identify an individual concept. The function can also be configured to identify the individual concept within an individual level of the hierarchical ontology, and obtain a related concept that pertains to the individual concept. The related concept can be obtained from the individual level of the hierarchical ontology or another level of the hierarchical ontology. The processor can be configured to execute the terminology analyzer, the function, or both.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This discussion relates to providing programmatic access to knowledge expressed in one or more terminologies, e.g., via one or more application programming interfaces ("APIs"). For example, the terminologies can be represented in a hierarchical form that can, in some instances, be derived from the terminologies. The terminologies can include various concepts as well as relationships between the concepts. In some implementations, the terminologies are standardized terminologies published by one or more entities, e.g., government or international agencies, standards organizations, industry organizations, etc. For example, SNOMED-CT is published by the National Library of Medicine, and ICD-9 is published by the World Health Organization ("WHO").

The disclosed implementations are described in the context of a health care scenario. Generally speaking, the disclosed API's offer functionality for performing operations on various terminologies. For example, the terminologies can be represented using hierarchical ontologies, and the API's can be used to traverse the hierarchical ontologies to identify synonyms, parents or ancestors, children or descendants, or sibling concepts provided therein. Note that the term "parent" is used broadly herein to mean "ancestor" and the term "child" is used broadly herein to mean "descendant." Where more specificity is needed, terms such as "immediate parent," "immediate child," "grandparent," "grandchild," etc. are used.

As one specific example of an API, a call to an API to retrieve synonyms for an input concept of "Ibuprofen" could retrieve synonyms such as the brand names "Advil®" or "Motrin®." This can be implemented by acquiring the synonym relationship from published terminologies, e.g., a published terminology can identify that Advil® is a synonym for Ibuprofen. As another example from a clinical context, synonyms can be used to identify different ways that clinicians can express the same diagnoses, e.g., different doctors in a given hospital may represent a "Right Radial Fracture" as "R radial fracture, RR fracture," etc. Existing techniques such as those used by search engines can be used to correct spelling, reorder words, etc. to accommodate different expressions of individual concepts.

Figure 1:
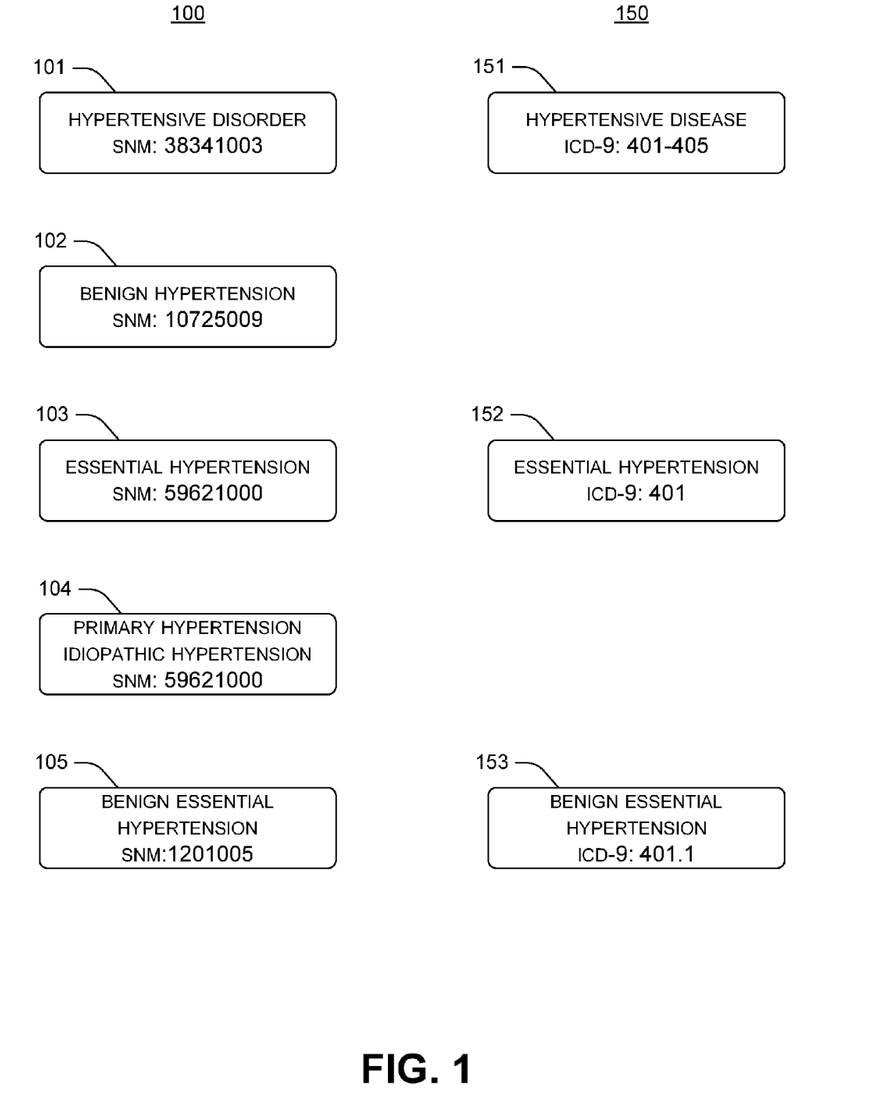
FIG. 1 shows exemplary terminologies that can be employed in some implementations of the present concepts.

FIG. 1 illustrates an exemplary terminology 100 that includes five different concept-code pairs 101-105, and another exemplary terminology 150 that includes three different concept-code pairs 151-153. For the purposes of this example, terminology 100 includes examples from the SNOMED terminology, and terminology 150 includes examples from the ICD-9 terminology. For example, concept-code pair 101 includes the concept "Hypertensive Disorder," and the SNOMED code "38341003." In some instances, the code for a given concept can encompass a range of code values, e.g., the concept-code pair 151 includes the concept "Hypertensive Disease" and the corresponding ICD-9 code range 401-405.

Unless otherwise indicated, the term "code" as used herein encompasses both individual codes as well as code ranges. Note that some of the concepts provided by terminology 100 are also provided by terminology 150, e.g., "Essential Hypertension" appears with SNOMED code 59621000 in terminology 100 and with ICD-9 code 9:401 in terminology 150. Furthermore, the term "concept-code pair" is used broadly herein to identify any association between a code and a concept, and includes instances where multiple codes are assigned to a single concept or a single code is assigned to multiple concepts, etc.

In some circumstances, a given terminology may include some information that explains some relationships among the concepts provided therein. For example, considering terminology 150, the ICD-9 code range "401-405" for "Hypertensive Disease" defines a range of codes for various hypertensive diseases. Likewise, the ICD-9 code 401 for "Essential Hypertension" defines a range of codes (401.1, 401.2, etc.) for various forms of essential hypertension. Thus, each numerical range of terminology 150 defines an "is-a" relationship between the corresponding concepts, e.g., "Benign Essential Hypertension" is a form of "Essential Hypertension" which is in turn a form of "Hypertensive Disease" in the ICD-9 terminology.

Figure 2:
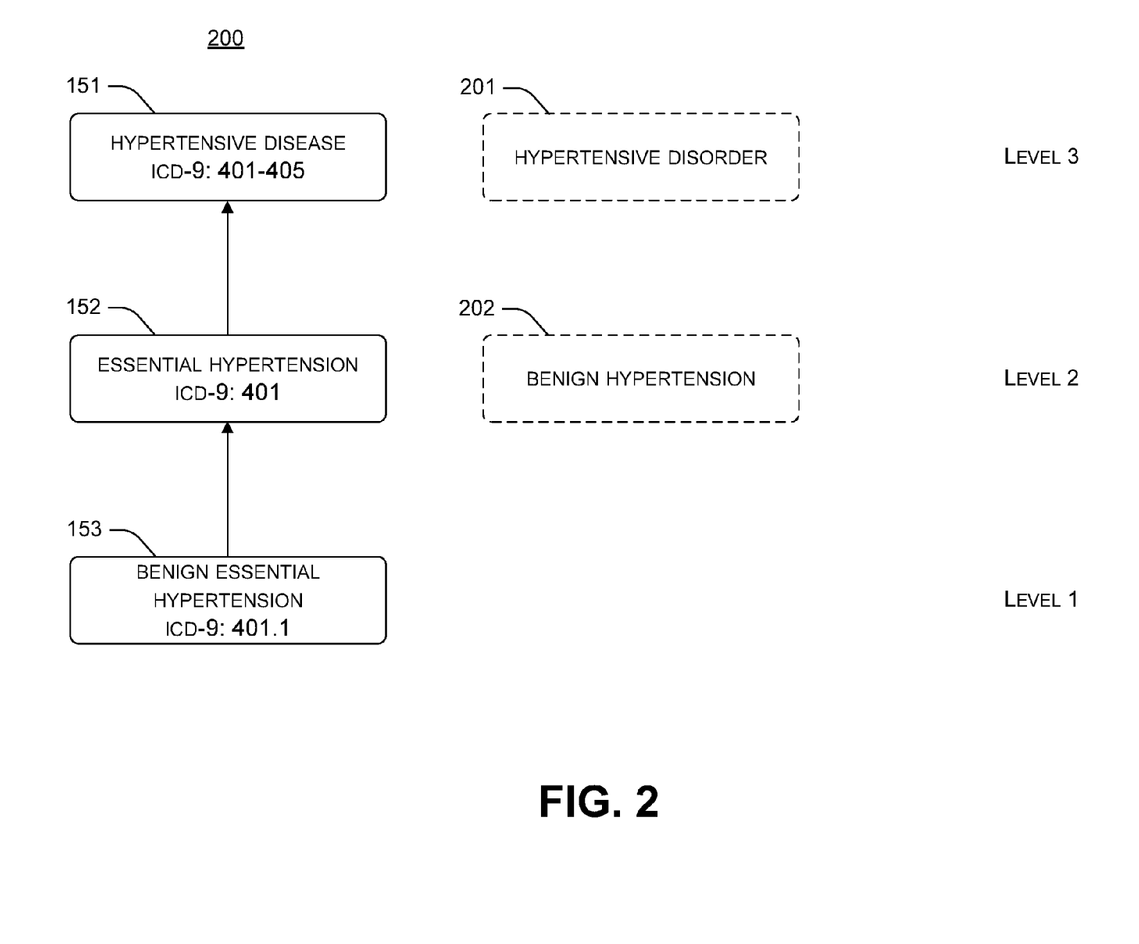
FIGS. 2-4 show examples of hierarchical ontologies in accordance with some implementations of the present concepts.

FIG. 2 illustrates an exemplary hierarchical ontology 200 derived from terminology 150. Note that the term "hierarchical ontology" as used herein is used broadly to include taxonomies or other systematic forms of classifying knowledge. By processing terminology 150, e.g., using the ICD-9 coding scheme mentioned above, hierarchical ontology 200 can be derived. For example, child or descendant concepts can be identified in ICD-9 by determining whether a given code falls within a range defined by another concept. Thus, for example, because code 401 falls within the code range 401-405, "Essential Hypertension" can be represented as a child concept of "Hypertensive Disease" within ontology 200. This is an "is-a" relationship that is represented by an arrow pointing from code-value pair 152 to code-value pair 151. Similarly, because code 401.1 falls within a range defined by code 401, "Benign Essential Hypertension" can be represented as a child concept of "Essential Hypertension." In this instance, the code 401 implicitly defines a range, e.g., between 401.0-401.9.

Also, note that hierarchical ontology 200 is illustrated as including multiple levels, 1, 2, and 3, with each concept being included in an individual level. Three levels are illustrated for simplicity of exposition, but in different implementations different numbers of levels are provided. Also, note that the number of levels is not necessarily explicitly conveyed by the terminology itself. Rather, the levels can be derived from the relationships expressed within the terminology. For example, since benign essential hypertension is a form of essential hypertension and essential hypertension is a form of hypertensive disease, the relationships among these concepts can be expressed using a three-level scheme as shown in FIG. 2.

In some implementations, the terminologies may include certain relationships that are "flattened" in order to map all of the concepts in a given terminology to a hierarchical ontology such as ontology 200. For example, a given terminology could include many different polydirectional relationships among concepts that are not represented in any particular hierarchical form by the terminology itself. Thus, the terminology may not provide a natural way to move "up" or "down" within the concepts identified by the terminology.

The disclosed implementations can explicitly map concepts from a terminology into various levels of a hierarchy. This, in turn, allows relationships between the concepts to be expressed in a way that has a clear meaning, e.g., using terms such as great grandparents, grandparents, parents, children, cousins, etc. In general, an arbitrary number of levels can be used for such a hierarchy. In some cases, for performance reasons, the number of levels can be limited so that a hierarchy can include a fixed, predetermined number of levels.

In FIG. 2, concepts 201 and 202 are shown in dashed lines to illustrate two concepts—"Hypertensive Disorder" and "Benign Hypertension"—that are not included in the ICD-9 terminology. As discussed in more detail below, however, these concepts can also be mapped to individual levels of a hierarchical ontology. For example, "Hypertensive Disorder" is a relatively high-level concept that, while not synonymous with "Hypertensive Disease," is of similar breadth. For reasons set forth in more detail below, it can be useful to map concepts of similar scope and breadth to an individual level of a hierarchical ontology to facilitate programmatic expression of relationships between different concepts. As another example, "Benign Hypertension" does not appear in the ICD-9 terminology, but is of similar breadth as the concept "Essential Hypertension," and accordingly these terms can be mapped to the same level, e.g., level 2.

Figure 3:
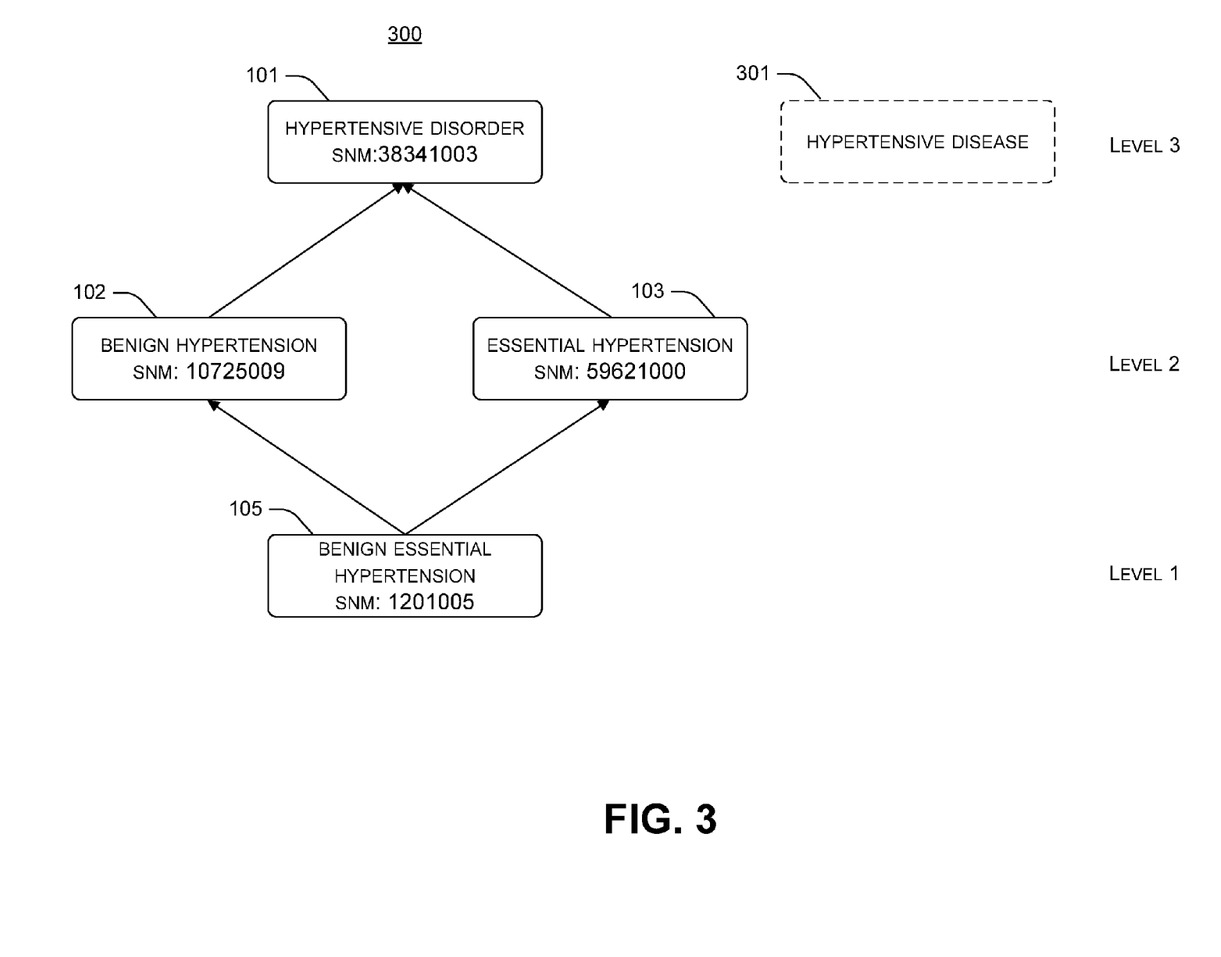

FIG. 3 illustrates an exemplary hierarchical ontology 300 that can be derived from terminology 100. As mentioned above with respect to hierarchical ontology 200, hierarchical ontology 300 can be derived by processing terminology 100. Also as above, the arrows going from one concept to another indicate "is a" relationships expressed by terminology 100. Also as above, hierarchical ontology 300 maps concept-code pairs from terminology 100 to multiple levels of a hierarchy. However, ontology 300 introduces a new complexity relative to ontology 200. The concept "Benign Essential Hypertension" has an "is-a" relationship with two different concepts in a higher level, e.g., both the "Benign Hypertension" and "Essential Hypertension" concepts in level 2. Note that terminology 100 does not include an explicit notion of a hierarchy as shown in FIG. 3. Rather, hierarchical ontology 300 can be derived from multiple relationships provided by terminology 100 by assigning each concept from terminology 100 to an individual level of hierarchical ontology 300.

In the previous example shown in FIG. 2, the concept "Hypertensive Disorder" was mapped to level 3 and shown in dashed lines to indicate that this concept does not appear in terminology 150. FIG. 3 illustrates a similar approach, where the concept "Hypertensive Disease" is mapped to level 3 and is shown in dashed lines to indicate that this concept does not appear in terminology 100. As mentioned above, however, "Hypertensive Disease" is a relatively high-level concept of similar breadth as "Hypertensive Disorder," and accordingly these two concepts are mapped to the same level, e.g., level 3.

Now, consider a user who wishes to find out more information about "Benign Essential Hypertension." In particular, the user is interested in more general classifications for "Benign Essential Hypertension." In other words, the user is asking the question, what broader concepts relate to this concept and appear in either terminology 100 or terminology 150? One approach for providing this information to the user would be to separately process the different terminologies on an ad-hoc basis to identify concepts that have "Benign Essential Hypertension" as a descendant. However, considering terminologies 100 and 150 as shown in FIG. 1, it is not apparent if or how the relationships that are expressed separately in these terminologies can be utilized together.

The following discussion builds on the examples set forth above to illustrate exemplary techniques for processing terminologies to extract meaningful information about relationships expressed therein. Relationships across multiple terminologies can be mapped to a combined hierarchical ontology to facilitate operations (e.g., queries) that reference the combined hierarchal ontology. For example, by processing the terminologies and classifying the various concepts expressed therein into different levels as set forth above, it is possible to provide a unified framework for answering queries that reference multiple terminologies.

Figure 4:
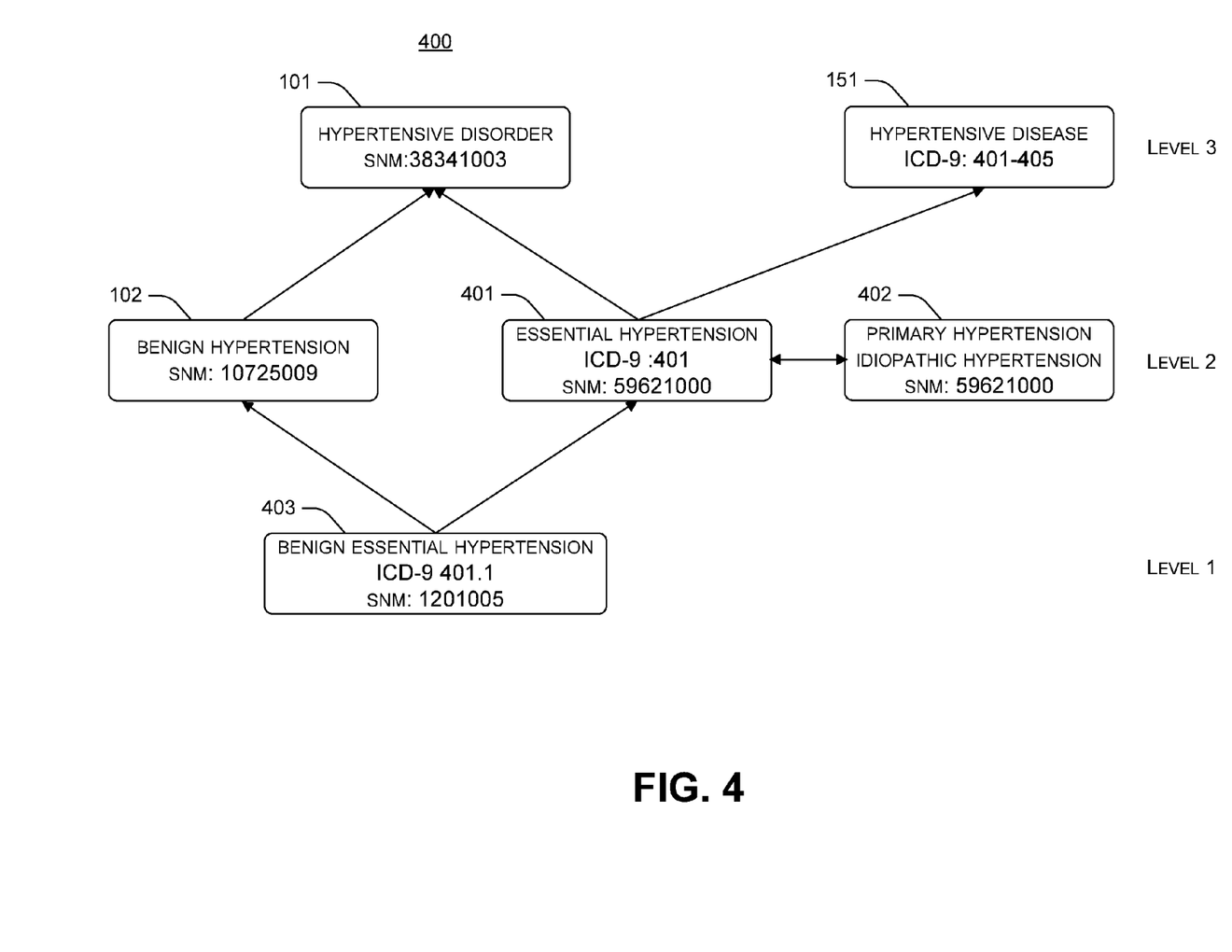

FIG. 4 illustrates an exemplary combined hierarchical ontology 400 that represents concepts and relationships expressed in both terminology 100 and terminology 150. Combined hierarchical ontology 400 includes concepts that appear in terminology 100 but not terminology 150, e.g., "Hypertensive disorder" and "Benign hypertension." Ontology 400 also includes some concepts that appear in terminology 150 but not terminology 100, e.g., "Hypertensive Disease." Furthermore, ontology 400 illustrates some synonymous concepts obtained from terminology 100, e.g., "Primary Hypertension" and "Idiopathic Hypertension" are synonyms of the concept "Essential Hypertension" in terminology 100. This synonym relationship is illustrated in FIG. 4 by the two-way arrow between concept-code pairs 401 and 402. Note that the synonym relationship can be derived from terminology 100 because all three concepts "Essential Hypertension," "Primary Hypertension," and "Idiopathic Hypertension" use the same SNOMED code, i.e., 59621000.

Combined hierarchical ontology 400 also includes concepts that appear in both terminologies 100 and 150, e.g., "Essential Hypertension" and "Benign Essential Hypertension" are shown in combined concept-code pairs 401 and 403. Combined concept-code pair 401 includes the individual concept "Essential Hypertension" and two corresponding codes from the different terminologies, i.e., ICD-9 401 and SNM 59621000. Likewise, combined concept-code pair 403 includes the individual concept "Benign Essential Hypertension" and two corresponding codes from the different terminologies, i.e., ICD-9 401.1 and SNM 1201005.

As introduced above with respect to hierarchical ontologies 200 and 300, each concept is mapped to a particular level of combined hierarchical ontology 400. However, because ontology 400 includes concept-code pairs from both terminologies, ontology 400 expresses hierarchical relationships between concepts across terminological boundaries. As one example, the concepts "Primary Hypertension" and "Idiopathic Hypertension" do not appear in terminology 150. Nevertheless, in hierarchical ontology 400, they are represented as synonyms of a concept from terminology 150, e.g., "Essential Hypertension." As another example, although the concept "Hypertensive Disease" does not appear in terminology 100, ontology 400 can be used to express concepts and codes from terminology 100 as children or parents of "Hypertensive Disease." Specifically, the code 1201005 from terminology 100 refers to a grandchild of "Hypertensive Disease" in ontology 400 even though terminology 100 does not itself include the concept "Hypertensive Disease."

Network System Example

Figure 5:
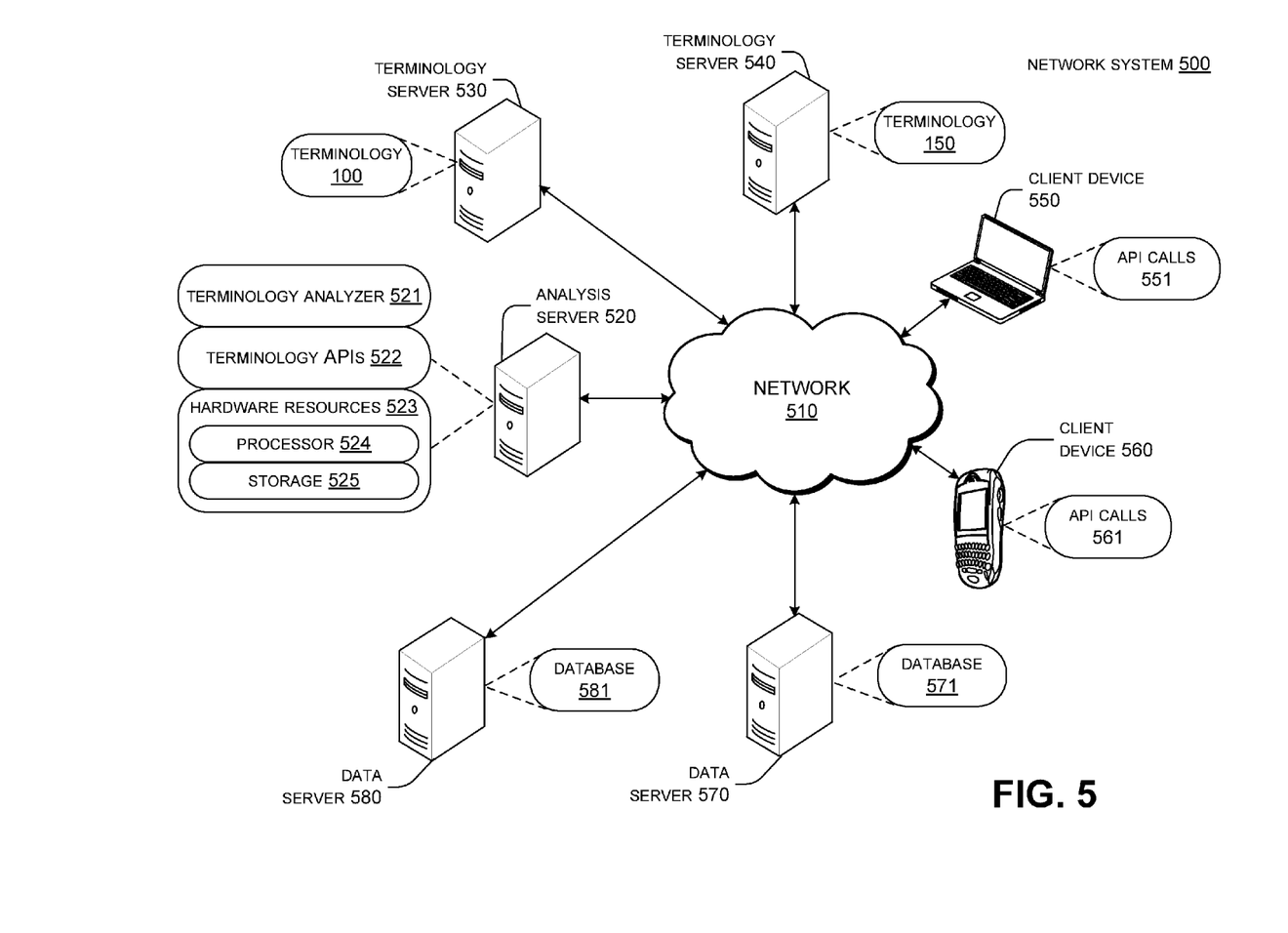
FIG. 5 shows an example of a system in accordance with some implementations of the present concepts.

FIG. 5 shows an exemplary network system 500 in which the techniques introduced above can be employed. As shown in FIG. 5, network system 500 includes a network 510 connecting numerous devices, such as an analysis server 520, terminology servers 530 and 540, client devices 550 and 560, and data servers 570 and 580. Terminology servers 530 and 540 can be controlled by one or more publishing entities that provide terminologies 100 and 150 to analysis server 520 over network 510, e.g., via periodic updates, etc.

Generally speaking, analysis server 520 can perform processing on the terminologies to map the terminologies to one or more hierarchal ontologies using terminology analyzer 521. Analysis server 520 can also provide programmatic access to the hierarchal ontologies via one or more terminology API's 522. In some implementations, terminology analyzer 521 can be configured to analyze multiple terminologies provided by terminology servers 530 and 540 and map the multiple terminologies to a combined hierarchical ontology such as hierarchical ontology 400. Analysis server 520 is shown with hardware resources 523, including one or more processors 524 and storage 525. Note that each of the computing devices shown in FIG. 5 (terminology servers 530 and 540, client devices 550 and 560, and data servers 570 and 580) can also include hardware resources such as those discussed herein with respect to analysis server 520. Hardware resources are omitted from FIG. 5 for these other computing devices due to space constraints.

Client devices 550 and 560 can invoke the terminology APIs via API calls 551 and 561, respectively. In some implementations, the client devices can invoke the terminology APIs to retrieve one or more related concepts from the hierarchical ontologies hosted by analysis server 520. The related concepts can be used in queries to retrieve data from databases 571 and/or 581 hosted by data servers 570 and 580, respectively.

In other implementations, the terminology APIs can be implemented directly by data servers 570 and/or 580 instead of by analysis server 520. In the following examples, databases 571 and 581 can include various medical databases and the databases may represent the data using different terminologies. For example, database 571 can include diagnoses in terminology 100 and database 581 can include diagnoses in terminology 150. As discussed in more detail below, client devices 550 and 560 can use the terminology APIs to query both databases 571 and 581. Thus, the terminology APIs provide a common interface for querying data represented in disparate terminologies.

As an example of how the terminologies can be applied to a real-world medical scenario, database 571 can include data for a first hospital, and database 581 can include data for a second hospital. The two hospitals can fall under a common management entity that wishes to provide practitioners with access to the data in both databases. Because the databases do not use the same terminologies, this could impose dependencies on applications executing on client devices 550 and/or 560. Using the terminology APIs discussed herein, these dependencies can be abstracted and applications on client devices 550 and/or 560 can use the terminology APIs to obtain data from databases 571 and 581 without special-purpose code tied to the different terminologies.

In addition, mapping multiple terminologies to a single hierarchy can facilitate providing information about the multiple terminologies using a common set of API calls, e.g., terminology APIs 522. Specifically, terminology APIs 522 can include various function calls to access the hierarchical ontology using a concept or code as an input to retrieve related concepts, codes, or concept-code pairs. For example, terminology APIs 522 can include individual functions to get synonyms for concepts or to get parents, children, or siblings of concepts. Depending on the inputs to the API calls, synonyms, parents, children, and/or siblings can be retrieved from individual terminologies or across multiple terminologies.

An individual function available via terminology APIs 522 can retrieve children or descendant concepts via an interface such as GetChildren (Concept, NameOfHierarchy). The Concept argument can represent an individual concept from a particular terminology, e.g., Benign Hypertension, Hypertensive Disorder, etc. In some implementations, the Concept argument can also be specified as a concept code, e.g., SNM 10725009, 38341003, etc. The NameOfHierarchy argument can represent a particular hierarchical ontology that the user wishes to search, e.g., any of hierarchical ontologies 200, 300, or 400. By selecting combined hierarchical ontology 400, the user can retrieve concepts from both terminologies 100 and 150. Alternatively, the user can retrieve concepts from a single terminology only by specifying a hierarchical ontology that only includes concepts from that terminology, e.g., the user can select hierarchical ontology 200 to retrieve only concepts from terminology 150 or can select hierarchical ontology 300 to retrieve only concepts from terminology 100.

As an example, consider a call to GetChildren ("Hypertensive Disorder," ontology 300), or alternatively, GetChildren (38341003, hierarchical ontology 300). The child concepts in hierarchical ontology 300 will be returned by the API call to the requester, e.g., client device 550 and/or 560. Analysis server 520 can search hierarchical ontology 300 for concepts that are one level below the input concept, "Hypertensive Disorder," and then send a response to the requesting client device that includes the concepts from the next-lower level. Thus, because Hypertensive Disorder is in level 3 and has two child concepts in level two, these two concepts "Benign Hypertension" and "EssentialHypertension" are returned by the function. Alternatively or in addition, the corresponding codes can be returned by the call to GetChildren, e.g., 10725009 and 5962100.

In further implementations, the GetChildren function can also have an input parameter that specifies a level of depth. If the level input is a "1" the function can return immediate children, e.g., as set forth above—for Hypertensive Disorder, Benign Hypertension and Essential Hypertension will be retrieved from level 2. If, however, the user selects 2 levels of depth, the grandchildren concepts of the concept specified by the input can be retrieved. In this example, the grandchild concept of Hypertensive Disorder is Benign Essential Hypertension and this concept is retrieved and provided in response to the call.

As mentioned above, the GetChildren function can also retrieve child concepts across multiple terminologies. For example, the user could specify a concept from ICD-9 terminology, e.g., "Hypertensive Disease" or the corresponding code range 401-405, and specify combined hierarchical ontology 400 with one level of depth. In this instance, the call can retrieve "Essential Hypertension" with both the ICD-9 code 401 and the SNOMED code 5962100. Similarly, with a depth argument of 2, the call can retrieve "Benign Essential Hypertension" with both the ICD-9 code of 401.1 and the SNOMED code of 1201005.

Parent or ancestor concepts can be retrieved by a different API function with an interface such as GetParents (Concept, NameOfHierarchy). The Concept and NameOfHierarchy arguments can be as described above with respect to the GetChildren function. Here, considering a call to GetParents ("Benign Essential Hypertension," hierarchical ontology 300), the parent concepts in hierarchical ontology 300 will be returned by the API call. Analysis server 520 can then send a response to the requesting client device that includes these concepts, e.g., BenignHypertension and EssentialHypertension and/or the corresponding codes 10725009 and 5962100.

Note that if ontology 400 were specified instead of ontology 300, the ICD-9 code 401 can also be returned by the call.

Synonyms can be retrieved by a function with an interface such as GetSynonyms (Concept, NameOfHierarchy). This function can retrieve synonyms specified by a particular terminology based on the input arguments. As a specific example, assume client device 550 makes a call to GetSynonyms with arguments ("Essential Hypertension", combined hierarchical ontology 400). Analysis server 520 can access combined hierarchical ontology 400, identify the "Essential Hypertension" concept, and determine that there are two synonyms in this ontology—"Primary Hypertension" and "Idiopathic Hypertension." Thus, these two concepts and/or the corresponding codes can be returned in response to the function call. Because hierarchical ontology 400 includes concepts from multiple terminologies, the codes from both terminologies can be returned. In this instance, both the ICD-9 and SNOMED codes for "Essential Hypertension," e.g., 401 and 5962100, are returned by analysis server 520.

Sibling concepts can be retrieved by a function with an interface such as GetSiblings (Concept, NameOfHierarchy). Generally speaking, a "sibling" or "cousin" concept is a concept from the same level of a given hierarchical ontology that is not necessarily a synonym. Sibling concepts are generally of similar breadth but two sibling concepts generally express at least some non-overlapping meaning. Like the other functions introduced above, the GetSiblings function can retrieve children concepts from a particular hierarchical ontology based on the input arguments. In some implementations, the GetSiblings interface can also identify a common ancestor concept and the function can return all descendants of the common ancestor at the same level as the input concept (e.g., identifying a parent would retrieve siblings, identifying a grandparent would retrieve first cousins, etc.). Alternatively, the GetSiblings interface can identify a number of levels instead of a specific ancestor such that requesting one level returns descendants of all parents, e.g., siblings, requesting two levels returns descendants of all grandparents, e.g., first cousins, etc.

As a specific example, assume client device 550 makes a call to GetSiblings with arguments ("Essential Hypertension", combined hierarchical ontology 400). Analysis server 520 can access ontology 400, identify the "Essential Hypertension" concept, and determine that "Essential Hypertension" has a sibling concept within this ontology—"Benign Hypertension." Thus, the concept "Benign Hypertension" and the corresponding SNOMED code 10725009 can be returned by this function call. Note that the GetChildren function can also retrieve concepts across terminological boundaries, e.g., the input concept "Essential Hypertension" can be expressed using the ICD-9 code 401 and the return values can include sibling concept codes from a different terminology, i.e., SNOMED. In this case, the sibling concept "Benign Hypertension" does not occur in the ICD-9 terminology used for the input code, but the user is still able to retrieve this concept because of the relationships expressed in combined hierarchical ontology 400.

First Method Example

Figure 6:
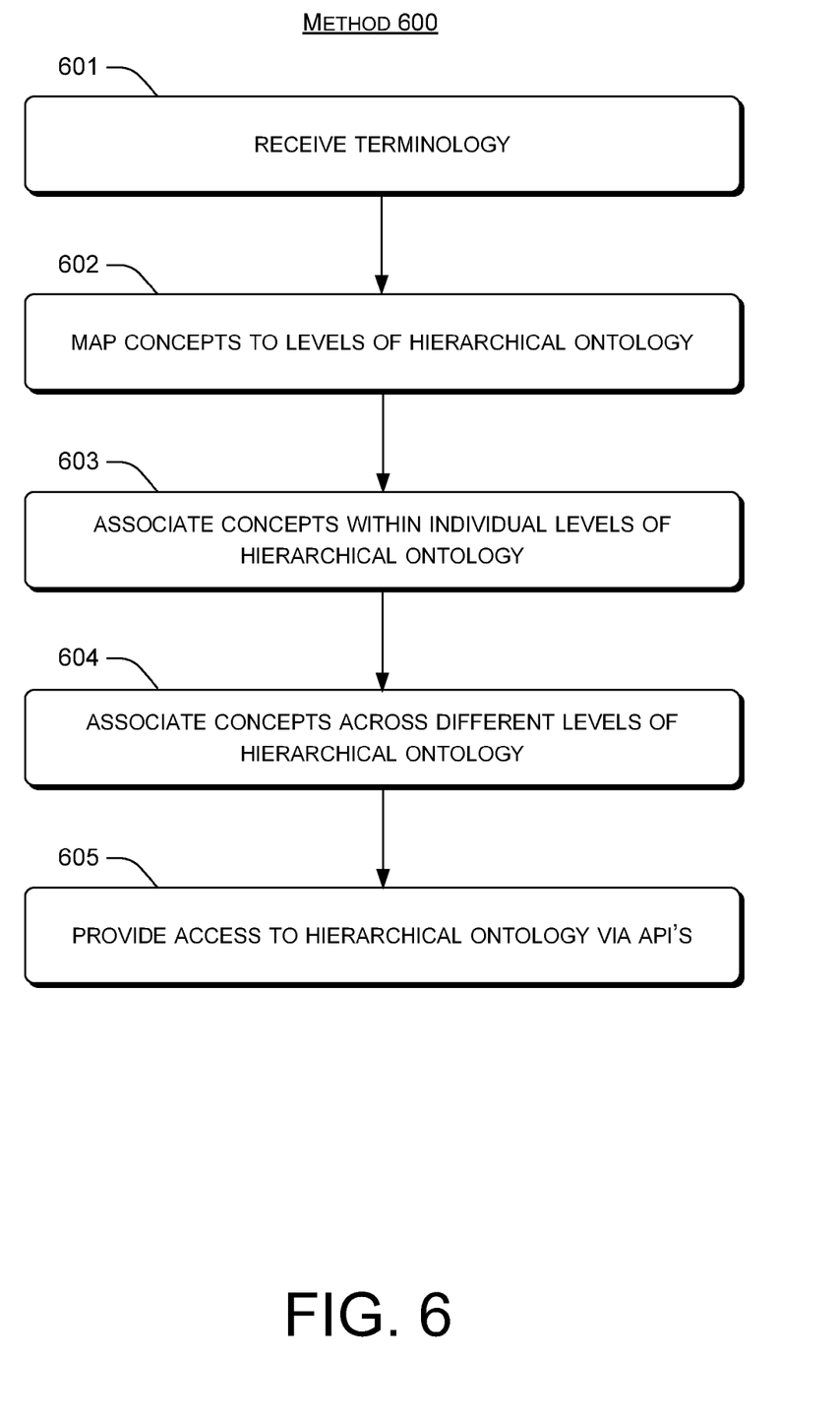
FIGS. 6 and 7 show flowcharts of exemplary methods in accordance with some implementations of the present concepts.

FIG. 6 illustrates an exemplary method 600 that can be used to create a hierarchical ontology such as ontology 200, 300, and/or 400. Generally speaking, method 600 can be performed by terminology analyzer 521 of analysis server 520 or one or more other modules.

At block 601, one or more terminologies are received. For example, terminology server 530 can send terminology 100 to analysis server 520, e.g., terminology 100 can be a new terminology and/or an update to an existing terminology.

Likewise, terminology server 540 can send terminology 150 to analysis server 520. As shown in FIG. 1, each terminology can include various concept-code pairs. Note that, in some implementations, terminology servers 530 and/or 540 can be operated by a publishing entity, e.g., the National Library of Medicine or the World Health Organization. In other implementations, terminology servers 530 and/or 540 can be operated by one or more intermediary organizations that process terminologies obtained from publishing entities in one form, e.g., a spreadsheet, and provide the terminologies to analysis server 520 in a different format, e.g., a query language based data format.

Next, at block 602, the concepts are mapped to levels of a hierarchical ontology. For example, each concept for a given terminology can be mapped to a particular level of one or more of hierarchical ontologies 200, 300, and/or 400. The levels to which concepts are mapped can reflect the relative breadth or specificity of the concept. In some cases, the relative breadth or specificity of a given concept can also be reflected by the terminology itself. For example, the ICD-9 codes for "Hypertensive Disease," "Essential Hypertension," and "Benign Essential Hypertension"—401-405, 401, and 401.1, respectively, numerically reflect the progressively narrower meanings of these concepts.

Note also that the individual concept-code pairs shown in FIG. 1 can be identified to select concepts that appear in multiple terminologies with different codes. For example, the concept "Benign Essential Hypertension" appears in both terminologies 100 and 150 with different codes, 1201005 and 401.1, respectively. In such cases, terminology analyzer 521 can associate the individual concept with both codes in a single level of a hierarchical ontology.

Next, at block 603, the concepts can be associated within individual levels of the hierarchical ontology. One example is associating synonymous concepts such as "Primary Hypertension," "Idiopathic Hypertension," and "Essential Hypertension" of ontology 400. A second example of associations within an individual level can include associating siblings within an individual level, e.g., concepts such as "Benign Hypertension" and "Essential Hypertension" can be associated as sibling concepts. A third example of associations within an individual level can include associating synonyms of siblings, e.g., "Benign Hypertension" can be associated with "Primary Hypertension" and "Idiopathic Hypertension" because these are synonyms of the sibling "Essential Hypertension."

Next, at block 604, concepts can be associated across different levels of a hierarchical ontology. As one example, child/parent concepts can be related on different levels. For concepts that appear in multiple terminologies, this can include associating a concept-code pair from one terminology with a code from another terminology. For example, the concept-code pair "Hypertensive Disease" and 401-405 from the ICD-9 terminology can be associated with the SNOMED code 5962100. This association can be identified because the "Essential Hypertension" concept appears in both terminologies and effectively "links" the different terminologies within combined hierarchical ontology 400.

Next, at block 605, access to the hierarchical ontology can be provided. For example, programmatic access can be provided via APIs such as the GetChildren, GetParents, GetSynonyms, and GetSiblings functions set forth above.

The example mentioned above includes examples that reference combined hierarchical ontology 400. However, in some implementations, hierarchical ontologies can first be created separately for individual terminologies. Thus, for example, terminology analyzer 521 can separately process terminology 100 and terminology 150 to obtain terminologies 200 and 300, respectively. Next, terminology analyzer 521 can combine these terminology-specific ontologies into combined ontology 400. Each concept from the terminology-specific ontologies can be mapped to a particular level of the combined hierarchical ontology. Thus, as mentioned above, concepts appearing in both terminologies can be used to link the two terminologies in the combined hierarchical ontology.

Second Method Example

Figure 7:
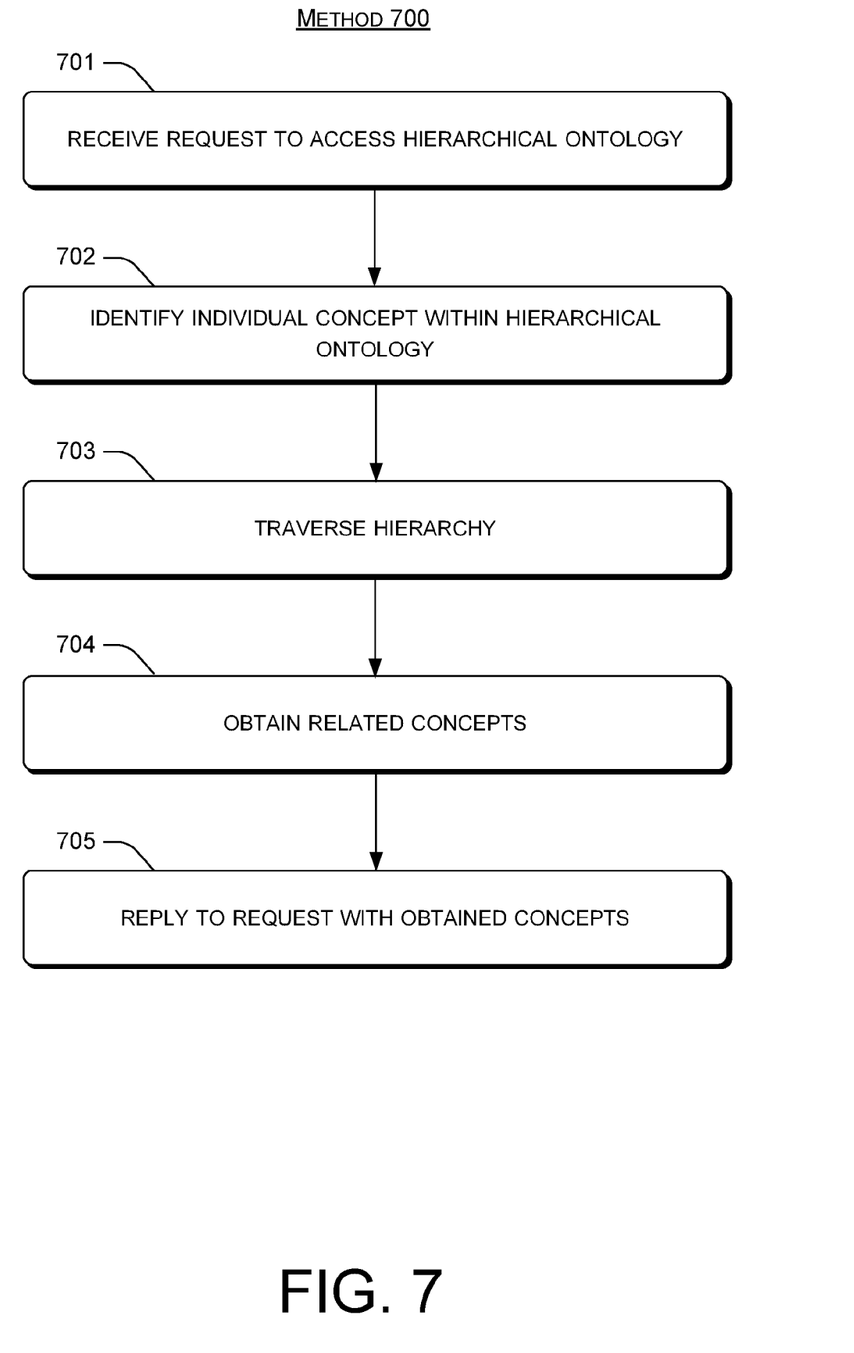

FIG. 7 illustrates an exemplary method 700 that can be used to provide programmatic access to a hierarchical ontology such as ontology 200, 300, and/or 400. Generally speaking, method 700 can be performed by terminology APIs 522 of analysis server 520, or one or more other modules.

At block 701, a request to access a hierarchical ontology can be received. For example, client devices 550 and/or 560 can execute a web service API call to an individual function, e.g., using a hypertext transfer protocol ("HTTP") or other network protocol. In some implementations, the API call can be received locally, e.g., from a client application on an individual device that also performs the API processing. In some implementations, the APIs disclosed herein can be used to enable expansion of queries, e.g., for structured query language ("SQL") statements. Exemplary web service and query language APIs are discussed more below.

Next, at block 702, an individual concept within the hierarchical ontology can be identified. For example, as mentioned above, the API call can be made with an input argument that specifies a concept or a concept code within a particular hierarchical ontology. In the examples shown herein, any of the concepts or concept codes shown in hierarchical ontologies 200, 300, and/or 400 can be identified based on such an input argument.

Next, at block 703, the hierarchy can be traversed based on the function that is called and the input arguments. As mentioned above, the hierarchy can be traversed one or more levels to identify child and/or parent concepts for an input concept or concept code. Likewise, the hierarchy can be traversed to identify synonymous concepts or sibling concepts for an input concept or concept code. Depending on the ontology which is selected, the traversal can be across terminological boundaries (e.g., combined ontology 400) or confined to an individual terminology (e.g., ontologies 200 and/or 300).

Next, at block 704, related concepts can be obtained. For example, the traversal of a hierarchical ontology to move up or down levels can identify concepts that pertain to the input concept or concept code but are relatively more (children) or less (ancestors) specific than the input concept or concept code. The traversal of the hierarchical ontology can also move laterally within an individual level to identify other concepts that are approximately as broad as the input concept, e.g., sibling or synonym concepts. Assuming equivalent input arguments, different concepts are obtained by the GetChildren function than by the GetParents function, etc. Thus, the concepts that are obtained at block 704 depend on the individual function from the API that is identified by the request. Note also that, in some instances, the related concepts can be identified by the concept names, e.g., "Essential Hypertension," and/or one or more concept codes, e.g., 401 and/or 5962100.

Next, at block 705, the related concepts obtained at block 704 can be provided in reply to the request. As mentioned above, the related concepts can be provided by name and/or code.

Query Expansion

As mentioned above, the API calls provided above can be used for query expansion, e.g., to facilitate access to one or more database tables. For example, databases 571 and 581 can be used by different hospitals, and may each include one or more tables identifying patients, diagnoses, and prescribed medications. Now consider a user that wishes to query both of the databases to identify all of the patients for either hospital that have been diagnosed with some type of hypertensive condition and have been prescribed any type of anticoagulant drug. Furthermore, the databases may include coded data from different terminologies used for the diagnoses (e.g., SNOMED vs. ICD-9) and other terminologies (e.g., RxNorm vs. First Databank, National Drug File—Reference Terminology, etc.) for the prescribed medications.

One brute-force approach would be to manually write a query condition that identifies every possible code for hypertensive conditions and anticoagulants from the various terminologies and separately query the databases. For example, one or more SQL SELECT statements could have one or more WHERE conditions that separately list each existing diagnosis code for hypertensive conditions and/or each possible medication code for all known anticoagulants. In instances where there are large numbers of codes, this approach could be relatively onerous for the developer.

However, using the API's provided above, it is possible to automate the process of identifying each code that is needed for such a query. Specifically, the first condition mentioned above could automatically be populated by calls to APIs set forth above to include the appropriate codes from ontology 400, e.g., by retrieving all the grandchildren of either "Hypertensive Disorder" or "Hypertensive Disease" from combined hierarchical ontology 400. Likewise, the second condition mentioned above could automatically be populated from a different ontology (not shown) that includes concept-code pairs from RxNorm and possibly one or more other medication terminologies.

In the example above, retrieving grandchildren can be performed by traversing from higher levels to lower levels in combined hierarchical ontology 400. However, as mentioned above it is also possible to retrieve higher-level concepts. For example, consider a clinician who wishes to obtain information on drugs that can be used to treat conditions such as "Essential Hypertension" as well as related conditions. One way to satisfy such a clinician is to first call the GetParents function with inputs of "Essential Hypertension" and "combined hierarchical ontology 400." This call can retrieve both the "Hypertensive Disorder" and "Hypertensive Disease" concepts, which can then be expanded by calls to the GetChildren function to retrieve related conditions to "Essential Hypertension," e.g., "Benign Hypertension." Viewed from one perspective, this technique of calling the GetParents function and then the GetChildren function can allow a user to generalize to obtain broader concepts and then drill down to more specific concepts that are children of the obtained broader concepts.

As another example, consider two different clinicians, a first clinician who wishes to have a list of all known painkillers, and a second clinician who wishes to know what medications are appropriate for treatment of a sore back. A hierarchical ontology listing only medications in a single terminology may be sufficient to honor the first clinician's request. However, for the second clinician, a combined hierarchical ontology may be more useful. For example, there may be no specific terminology that identifies particular treatments for a sore back. However, the "sore back" concept could be generalized to a higher-level diagnosis concept such as "muscle pain," and a particular terminology could identify "Ibuprofen" as a particular treatment for "muscle pain." A different terminology, e.g., RxNorm, can be used to expand the "Ibuprofen" concept to specific drugs that include Ibuprofen, e.g., the aforementioned "Advil®" or "Motrin®" brand name or specific versions thereof (dosages, combinations with other medications, etc.).

As mentioned above, the terminology APIs can be called using protocols such as HTTP, e.g., as web service APIs. For example, the functions introduced above for retrieving children, parents, siblings, and synonyms can be invoked by client devices 550 and/or 560 to retrieve concepts from one or more ontologies. The client devices can then include the retrieved concepts in query language statements directly, e.g., in one or more conditions of a SQL statement. In other words, the client device may rewrite a given SQL statement using the retrieved concepts.

In other implementations, the terminology APIs can be invoked directly via a query language. For example, a call to an individual terminology API can be embedded in a condition of a SQL statement, and the individual databases can execute the API call to retrieve concepts from an ontology. Said differently, the SQL condition can include the API call instead of the list of retrieved concepts.

Hardware Resources

The terms "computer," "client device," "server" and "computing device" as used herein can mean any type of device that has some amount of processing capability and/or storage capability. For example, the various functionality described above with respect to FIG. 5 can be implemented or provided using software, hardware, and/or firmware. As mentioned above, each of the computing devices shown in FIG. 5 can have various hardware resources 523, such as processor 524 and storage 525. For example, software, hardware, and/or firmware modules can be used to implement or provide terminology analyzer 521, terminology APIs 522, terminologies 100 and 150, API calls 551 and 561, and databases 571 and 581.

Note also that, in some implementations, individual modules discussed herein can also reside on different devices than the configuration shown in FIG. 5. For example, in some instances, the client devices or servers can comprise multiple computing devices or machines, such as in a distributed environment. In such a configuration, each of the methods discussed herein can be implemented using distributed processing across the multiple computing devices or machines.

Conversely, some implementations may combine certain functionality disclosed herein with respect to multiple computing devices by collocating certain functionality on a single computing device. As a specific example, terminology analyzer 521 and/or terminology APIs 522 can be provided together on an individual data server along with one or more databases. As another example, terminology analyzer 521 and/or terminology APIs 522 can be provided together on an individual terminology server along with one or more terminologies. In further implementations, a single computing device can host multiple terminologies, terminology analyzer 521, terminology APIs 522, and one or more applications that make API calls 551/561.

In some instances, processor 524 can execute data in the form of computer-readable instructions to provide such functionality as described above. Data, such as computer-readable instructions, can be stored on storage 525. Storage 525 can include various types of computer-readable storage devices and can be internal or external to a computing device. For example, storage 525 can include any one or more of volatile or non-volatile memory, hard drives, and/or optical storage devices (e.g., CDs, DVDs etc.), among others. Furthermore, each of the computing devices shown in FIG. 5 can also be configured to receive and/or generate data in the form of computer-readable instructions from external storage devices (not shown) or over network 510.

Examples of external storage can include optical storage devices (e.g., CDs, DVDs etc.), hard drives, and flash storage devices (e.g., memory sticks or memory cards), among others. In some cases, the modules discussed herein can be installed on a computing device during assembly or at least prior to delivery of the computing device. In other scenarios, the modules discussed herein can be installed after delivery, such as a download available over network 510 or by installing an external storage device in an individual computing device. The modules discussed herein can be manifest as freestanding applications, application parts and/or part of an operating system. As used herein, the term "computer-readable media" can include transitory and non-transitory computer-readable instructions. In contrast, the term "computer-readable storage media" excludes transitory instances. Computer-readable storage media includes "computer-readable storage devices" as mentioned above.

In some variations of the illustrated network system 500, each computing device is configured with a general purpose processor and storage. In other variations, one or more of the computing devices can include a system on a chip (SOC) type design. For example, functionality provided by the terminology analyzer and/or terminology APIs can be integrated on a single SOC or multiple coupled SOCs. In one such example, the analysis server can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include the terminology analyzer or terminology APIs.

Shared resources can be storage, processing units, etc. that can be used by multiple functionalities. In this example, the shared resources can include the processor. As mentioned above, the terminology analyzer or APIs can be implemented as dedicated resources. In other configurations, the terminology analyzer or APIs can be implemented on the shared resources and/or the processor can be implemented on the dedicated resources.

CONCLUSION

The above examples are presented in the context of various health care scenarios. This is partly because clinical scenarios include many examples of mature, trusted terminologies that are available for use as discussed above. However, the concepts discussed above can also be applied outside the health care field. For example, consider a social networking terminology that includes concepts such as friend, friend of a friend, invite, professional contact, etc. Using the implementations discussed above, such concepts can be mapped to one or more hierarchical ontologies and accessed using the APIs mentioned above. In short, the concepts discussed above are applicable to any context where appropriate terminologies are available.

The order in which the example methods are described is not intended to be construed as a limitation, and any number of the described blocks or steps can be combined in any order to implement the methods, or alternate methods. Furthermore, the methods can be implemented in any suitable hardware, software, firmware, or combination thereof, such that a computing device can implement the methods. In one case, the methods are stored on one or more computer-readable storage media as a set of instructions such that execution by one or more computing devices causes the one or more computing devices to perform the method.

Although techniques, methods, devices, systems, etc., pertaining to secure patient information handling are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by at least one computing device, the method comprising:
  receiving a first terminology comprising first concepts and corresponding first codes;
  receiving a second terminology comprising second concepts and corresponding second codes;
  mapping the first concepts and the second concepts to levels of a combined hierarchical ontology;
  associating some of the first concepts and the second concepts within the combined hierarchical ontology; and
  providing programmatic access to the combined hierarchical ontology,
  wherein the providing programmatic access comprises:
    receiving a request identifying an individual first concept-code pair, the request identifying a number of levels to traverse the combined hierarchical ontology, the number of levels being greater than one;
    traversing the combined hierarchical ontology the identified number of levels to identify an ancestor concept-code pair of the individual first concept-code pair, and
    identifying, in the combined hierarchical ontology, a sibling concept-code pair of the individual first concept-code pair that shares the ancestor concept-code pair with the individual first concept-code pair but has a different meaning than the individual first concept-code pair.

2. The method according to claim 1, wherein the sibling concept-code pair is an individual second concept-code pair.

3. The method according to claim 2, wherein the number of levels to traverse is two and, in the combined hierarchical ontology, the ancestor concept-code pair shared by the individual first concept-code pair and the individual second concept-code pair is a grandparent of both the individual concept-code pair and the individual second concept-code pair.

4. The method according to claim 1, wherein the request identifies an individual first concept of the individual first concept-code pair.

5. The method according to claim 4, wherein the request identifies an individual first code of the individual first concept-code pair.

6. The method according to claim 1, wherein the providing programmatic access comprises identifying, in the combined hierarchical ontology, multiple other concept-code pairs that also share the ancestor concept-code pair with the individual first concept-code pair but have different meanings than the individual first concept-code pair.

7. A method performed by at least one hardware processor executing computer-readable instructions stored on at least one computer-readable storage device, the method comprising:
  receiving a sibling request to access a combined hierarchical ontology, the combined hierarchical ontology comprising first concepts and corresponding first codes associated with the first concepts by a first terminology and second concepts associated with second codes by a second terminology, wherein the sibling request identifies a specified first concept that is on a particular level of the combined hierarchical ontology and the sibling request specifies a number of levels to traverse the combined hierarchical ontology, the number of levels being greater than one;

traversing the combined hierarchical ontology the number of levels specified by the sibling request to identify a common ancestor shared by the specified first concept and a corresponding second concept, wherein the corresponding second concept has a different meaning than the specified first concept and is also on the particular level of the combined hierarchical ontology with the specified first concept; and responding to the sibling request with the corresponding second concept that shares the common ancestor with the specified first concept.

8. The method according to claim 7, wherein the first terminology comprises a first medical terminology and the second terminology comprises a second medical terminology.

9. The method according to claim 8, wherein the first medical terminology comprises an International Classification of Diseases terminology.

10. The method according to claim 9, wherein the second medical terminology comprises a Systemized Nomenclature of Medicine terminology.

11. The method according to claim 7, wherein the common ancestor appears in the second terminology but not the first terminology.

12. The method of claim 11, wherein the specified first concept also appears in the second terminology.

13. The method of claim 12, wherein the corresponding second concept does not appear in the first terminology.

14. The method according to claim 7, wherein the specified first concept is identified in the sibling request by a corresponding specified first code.

15. The method of claim 7, wherein the combined hierarchical ontology has at least one level that is lower than the particular level.

16. A system comprising:

one or more hardware processors; and one or more computer-readable storage devices storing computer-readable instructions which, when executed by the one or more hardware processors, cause the one or more hardware processors to:

receive a sibling request to access a combined hierarchical ontology, the combined hierarchical ontology comprising first concepts and first codes associated with the first concepts by a first terminology and second concepts and second codes associated with the second concepts by a second terminology, wherein the sibling request identifies a specified first concept that is on a particular level of the combined hierarchical ontology and the sibling request specifies a number of levels to traverse the combined hierarchical ontology, the number of levels being greater than one;

traverse the combined hierarchical ontology the number of levels specified by the sibling request to identify a common ancestor shared by the specified first concept and a corresponding second concept, wherein the corresponding second concept has a different meaning than the specified first concept and is also on the particular level of the combined hierarchical ontology with the specified first concept; and provide a response to the sibling request that identifies the corresponding second concept that shares the common ancestor with the specified first concept.

17. The system of claim 16, wherein the specified first concept has another ancestor that is not the common ancestor and the another ancestor is not shared by the corresponding second concept.

18. The system of claim 16, embodied as a single server computing device.

19. The system of claim 16, wherein the response identifies the corresponding second concept using a corresponding second code of the second concept.

20. The system of claim 16, wherein the response includes the corresponding second concept and does not include a corresponding second code of the second concept.

* * * * *